US011112515B2

United States Patent
Fu et al.

(10) Patent No.: US 11,112,515 B2
(45) Date of Patent: Sep. 7, 2021

(54) SEISMIC VELOCITY DERIVED HYDROCARBON INDICATION

(71) Applicant: BP Corporation North America Inc., Houston, TX (US)

(72) Inventors: Kang Fu, Katy, TX (US); Dianne Ni, Katy, TX (US)

(73) Assignee: BP CORPORATION NORTH AMERICA INC., Houston, TX (US)

( * ) Notice: Subject to any disclaimer, the term of this patent is extended or adjusted under 35 U.S.C. 154(b) by 348 days.

(21) Appl. No.: 16/359,559

(22) Filed: Mar. 20, 2019

(65) Prior Publication Data

US 2019/0302288 A1   Oct. 3, 2019

Related U.S. Application Data

(60) Provisional application No. 62/650,667, filed on Mar. 30, 2018.

(51) Int. Cl.
*G01V 1/28* (2006.01)
*G01V 1/30* (2006.01)
*G01V 1/34* (2006.01)

(52) U.S. Cl.
CPC .............. *G01V 1/282* (2013.01); *G01V 1/301* (2013.01); *G01V 1/303* (2013.01); *G01V 1/345* (2013.01);
(Continued)

(58) Field of Classification Search
CPC ........ G01V 1/282; G01V 1/303; G01V 1/301; G01V 1/345; G01V 2210/60; G01V 2210/512
See application file for complete search history.

(56) References Cited

U.S. PATENT DOCUMENTS 7,768,870 B2 *   8/2010   Broto ............. G01V 1/303 367/25
2013/0028052 A1 *   1/2013   Routh ............. G01V 1/28 367/43

(Continued)

FOREIGN PATENT DOCUMENTS

AU   2019243973 A1 *  10/2020   ............ G01V 1/345
CA      3094120 A1 *  10/2019   ............ G01V 1/345
(Continued)

OTHER PUBLICATIONS

Mukerji et al., "Statistical rock physics: Combining rock physics, information theory, and geostatistics to reduce uncertainty in seismic reservoir characterization", The Leading Edge, Mar. 1, 2001, pp. 313-319 (Year: 2001).*

*Primary Examiner* — Daniel Pihulic
(74) *Attorney, Agent, or Firm* — Conley Rose, P.C.

(57) ABSTRACT

A velocity model is generated based upon seismic waveforms via any seismic model building method, such as full waveform inversion or tomography. Data representative of a measurement of a physical attribute of an area surrounding a well is received and an attribute model is generated based upon the velocity model and the data. An image is rendered based upon the attribute model for use with seismic exploration above a region of a subsurface comprising a hydrocarbon reservoir and containing structural or stratigraphic features conducive to a presence, migration, or accumulation of hydrocarbons.

18 Claims, 5 Drawing Sheets

(52) U.S. Cl.
CPC .... *G01V 2210/512* (2013.01); *G01V 2210/60* (2013.01)

(56) References Cited

U.S. PATENT DOCUMENTS

| | | | |
|---|---|---|---|
| 2015/0012256 A1* | 1/2015 | Routh | G01V 1/28 703/10 |
| 2019/0302288 A1* | 10/2019 | Fu | G01V 1/282 |

FOREIGN PATENT DOCUMENTS

| | | | | |
|---|---|---|---|---|
| CN | 111971586 A | * | 11/2020 | G01V 1/282 |
| WO | WO-2012134621 A1 | * | 10/2012 | G01V 1/28 |
| WO | WO-2019191368 A1 | * | 10/2019 | G01V 1/301 |

* cited by examiner

SEISMIC VELOCITY DERIVED HYDROCARBON INDICATION

BACKGROUND

The present disclosure relates generally to analyzing seismic data, and more specifically, to generation of an attribute model for imaging of hydrocarbons present in a seismic surveyed region.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A seismic survey includes generating an image or map of a subsurface region of the Earth by sending sound energy down into the ground and recording the reflected sound energy that returns from the geological layers within the subsurface region. During a seismic survey, an energy source is placed at various locations on or above the surface region of the Earth, which may include hydrocarbon deposits (e.g., a region within a subsurface region that contains hydrocarbons). Each time the source is activated, the source generates a seismic (e.g., sound wave) signal that travels downward through the Earth, is reflected, and, upon its return, is recorded using one or more receivers disposed on or above the subsurface region of the Earth. The seismic data recorded by the receivers may then be used to create an image or profile of the corresponding subsurface region.

Over time, as hydrocarbons are being extracted from the subsurface region of the Earth, the location, saturation, and other characteristics of the hydrocarbon reservoir and (e.g., overburden) within the subsurface region may change. As such, it may be useful to determine how the image or map of the subsurface region changes over time, such that the operations related to extracting the hydrocarbons may be modified to more efficiently extract the hydrocarbons from the subsurface region of the Earth.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Seismic acquisition utilizing sources and receivers may be useful in the generation of, for example, seismic images. Seismic images may be used, for example, in the determination of hydrocarbon deposits (e.g., areas within a subsurface that contain hydrocarbons) and/or subsurface drilling hazards. Seismic images are generally produced based on seismic waveforms produced by the source that reflect off regions within a subsurface and are received by receivers. The seismic image may be constructed using a high resolution seismic velocity model, such as full waveform inversion (FWI) model a tomography model or the like applied, for example, via a velocity model builder. The seismic velocity model includes data that is indicative of a change in velocity of the seismic waveforms as they propagate through the subsurface region. The change in the velocity of the seismic waveforms is indicative of the type of fluid (brine, oil or gas) present. However, the sensitivity of the velocity decreases with increasing depth within the subsurface region and/or based on the respective formation attributes (e.g., rock porosity or the like). As such, it may be difficult to ascertain the locations of hydrocarbon deposits at increased depths of a subsurface and/or that lie below certain portions of a formation using a seismic velocity model. Accordingly, present embodiments are directed to techniques for producing an alternate attribute model based on the seismic velocity model that includes data representative of a physical attribute of the area.

Calibration or other adjustments are applied to a seismic velocity determination to compensate for reduced velocity sensitivities at increased depths and/or in response to particular attributes of a formation (e.g., rock densities). The velocity calibration may be represented as an attribute similar to fluid saturation, hence named as saturation based on velocity (SV). In one embodiment, SV is determined using a combination of the seismic velocity and velocity data obtained from well logs. In another embodiment, SV is derived from an assumption that the seismic velocity is a geometric average of sediment velocity for rocks in brine and sediment velocity for rocks filled with hydrocarbon with respective weights of 1-SV and SV. In another embodiment, SV is a function of sediment velocity for sand or shale. In this manner, indications of hydrocarbons present in a formation may be derived from a seismic velocity. In a preferred embodiment, the velocities are produced by full waveform inversion (FWI).

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Seismic data may provide valuable information with regard to the description such as the location and/or change of hydrocarbon deposits within a subsurface region of the Earth. Additionally, processing of the seismic data may be accomplished utilizing different techniques that may be selected based on, for example, the formation attributes and/or differing depths of the formation to be analyzed and/or imaged. Accordingly, in one embodiment, a higher resolution image (e.g., a higher quality image) for particular portions of a formation may be generated through selecting a particular type of processing (i.e., modification of seismic data processing techniques selected based on formation attributes and/or depths of a formation to achieve a higher resolution image of a particular portion of a formation).

Figure 1:
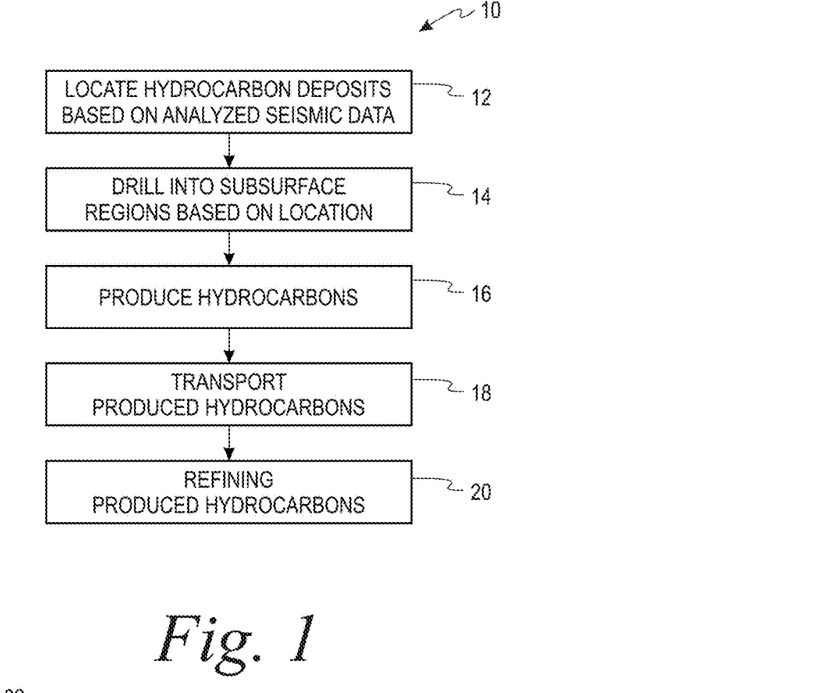
FIG. 1 illustrates a flow chart of various processes that may be performed based on analysis of seismic data acquired via a seismic survey system, in accordance with embodiments presented herein.
Figure 2:
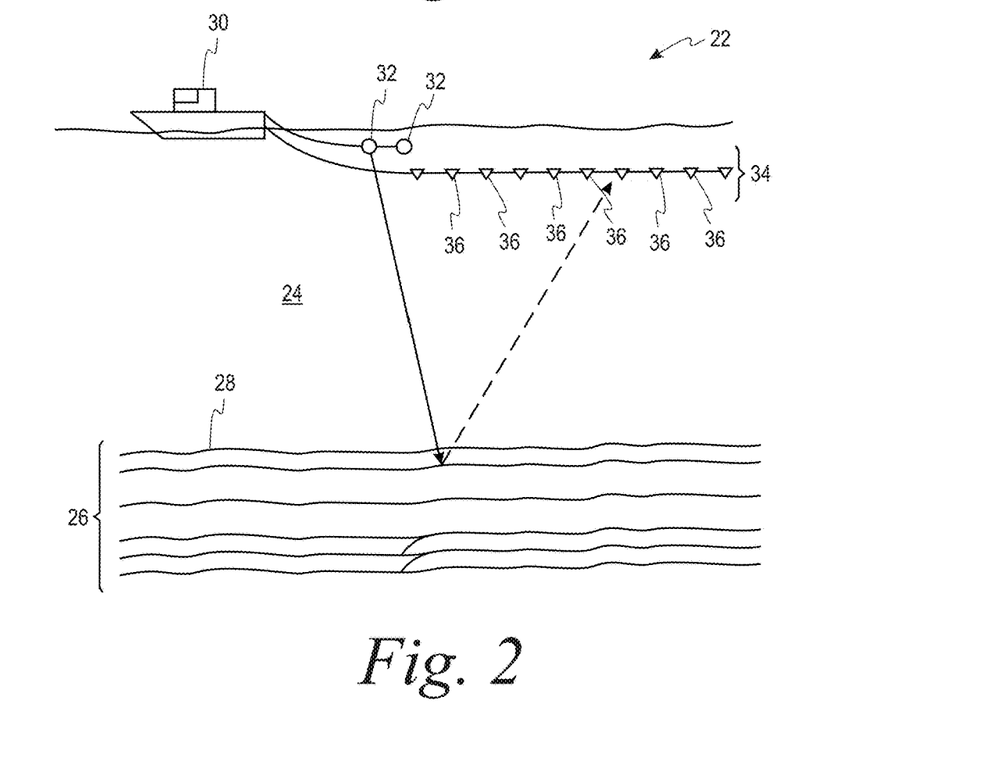
FIG. 2 illustrates a marine survey system in a marine environment, in accordance with embodiments presented herein.
Figure 3:
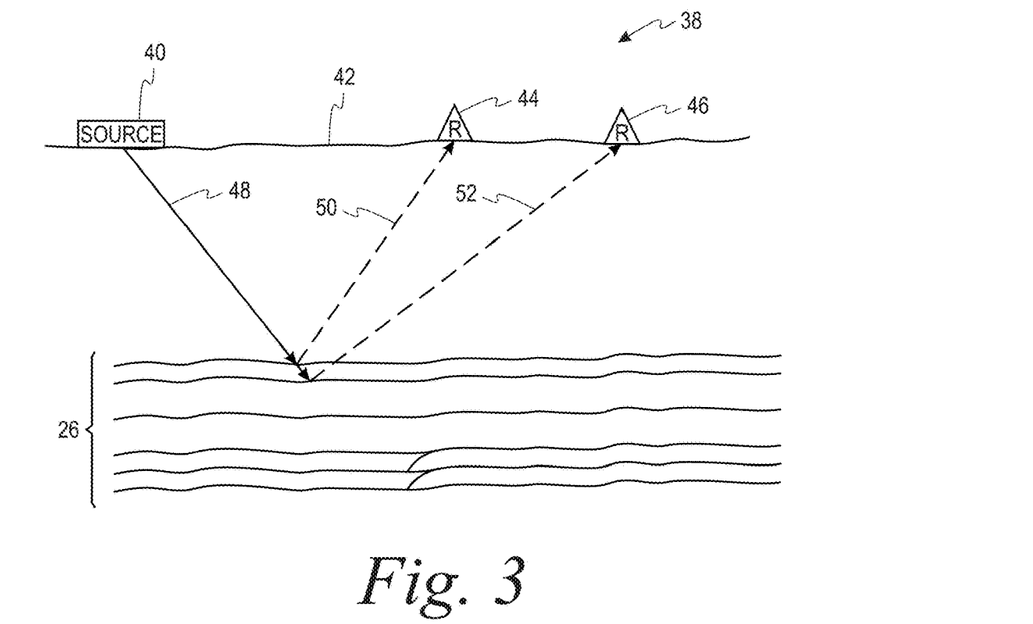
FIG. 3 illustrates a land survey system in a non-marine environment, in accordance with embodiments presented herein.

By way of introduction, seismic data may be acquired using a variety of seismic survey systems and techniques, two of which are discussed with respect to FIG. 2 and FIG. 3. Regardless of the seismic data gathering technique utilized, after the seismic data is acquired, a computing system may analyze the acquired seismic data and may use the results of the seismic data analysis (e.g., seismogram, map of geological formations, etc.) to perform various operations within the hydrocarbon exploration and production industries. For instance, FIG. 1 illustrates a flow chart of a method 10 that details various processes that may be undertaken based on the analysis of the acquired seismic data. Although the method 10 is described in a particular order, it should be noted that the method 10 may be performed in any suitable order.

Referring now to FIG. 1, at block 12, locations and properties of hydrocarbon deposits within a subsurface region of the Earth associated with the respective seismic survey may be determined based on the analyzed seismic data. In one embodiment, the seismic data acquired via one or more seismic acquisition techniques may be analyzed to generate a map or profile that illustrates various geological formations within the subsurface region.

Based on the identified locations and properties of the hydrocarbon deposits, at block 14, certain positions or parts of the subsurface region may be explored. That is, hydrocarbon exploration organizations may use the locations of the hydrocarbon deposits to determine locations at the surface of the subsurface region to drill into the Earth. As such, the hydrocarbon exploration organizations may use the locations and properties of the hydrocarbon deposits and the associated overburdens to determine a path along which to drill into the Earth, how to drill into the Earth, and the like.

After exploration equipment has been placed within the subsurface region, at block 16, the hydrocarbons that are stored in the hydrocarbon deposits may be produced via natural flowing wells, artificial lift wells, and the like. At block 18, the produced hydrocarbons may be transported to refineries and the like via transport vehicles, pipelines, and the like. At block 20, the produced hydrocarbons may be processed according to various refining procedures to develop different products using the hydrocarbons.

It should be noted that the processes discussed with regard to the method 10 may include other suitable processes that may be based on the locations and properties of hydrocarbon deposits as indicated in the seismic data acquired via one or more seismic survey. As such, it should be understood that the processes described above are not intended to depict an exhaustive list of processes that may be performed after determining the locations and properties of hydrocarbon deposits within the subsurface region.

With the forgoing in mind, FIG. 2 illustrates a marine survey system 22 (e.g., for use in conjunction with block 12 of FIG. 1) that may be employed to acquire seismic data (e.g., waveforms) regarding a subsurface region of the Earth in a marine environment. Generally, a marine seismic survey using the marine survey system 22 may be conducted in an ocean 24 or other body of water over a subsurface region 26 of the Earth that lies beneath a seafloor 28.

The marine survey system 22 may include a vessel 30, a seismic source 32, a streamer 34, a receiver 36, and/or other equipment that may assist in acquiring seismic images representative of geological formations within a subsurface region 26 of the Earth. The vessel 30 may tow the seismic source 32 (e.g., airgun array) that may produce energy, such as sound waves (e.g., seismic waveforms), that is directed at a seafloor 28. The vessel 30 may also tow the streamer 34 having a receiver 36 (e.g., hydrophones) that may acquire seismic waveforms that represent the energy output by the seismic sources 32 subsequent to being reflected off of various geological formations within the subsurface region 26. Although the receiver 36 is described as being towed by the vessel 30, in some embodiments, receiver 36 may also be deployed on the surface of the seafloor 28. Additionally, although the description of the marine survey system 22 is described with one seismic source 32 (represented in FIG. 2 as an airgun array) and one receiver 36 (represented in FIG. 2 as a plurality of hydrophones), it should be noted that the marine survey system 22 may include multiple seismic sources 32 and multiple seismic receivers 36. In the same manner, although the above descriptions of the marine survey system 22 is described with one seismic streamer 34, it should be noted that the marine survey system 22 may include multiple seismic streamers 34. In addition, additional vessels 30 may include additional sources 32, streamers 34, and the like to perform the operations of the survey system.

FIG. 3 illustrates a land survey system 38 (e.g., for use in conjunction with block 12 of FIG. 1) that may be employed to obtain information regarding the subsurface region 26 of the Earth in a non-marine environment. The land survey system 38 may include a land-based seismic source 40 and land-based receiver 44. In some embodiments, the land survey system 38 may include one or more multiple seismic sources 40 and one or more receivers 44 and 46. Indeed, for discussion purposes, FIG. 3 includes a land-based seismic source 40 and two seismic receivers 44 and 46. The land-based seismic source 40 (e.g., seismic vibrator) that may be disposed on a surface 42 of the Earth above the subsurface region 26 of interest. The land-based seismic source 40 may produce energy (e.g., sound waves, seismic waveforms) that is directed at the subsurface region 26 of the Earth. Upon reaching various geological formations (e.g., salt domes, faults, folds) within the subsurface region 26 the energy output by the land-based seismic source 40 may be reflected off of the geological formations and acquired or recorded by one or more land-based receivers (e.g., 44 and 46).

In some embodiments, the land-based receivers 44 and 46 may be dispersed across the surface 42 of the Earth to form a grid-like pattern. As such, each land-based receiver 44 or 46 may receive a reflected seismic waveform in response to energy being directed at the subsurface region 26 via the seismic source 40. In some cases, one seismic waveform produced by the seismic source 40 may be reflected off of different geological formations and received by different receivers. For example, as shown in FIG. 3, the seismic source 40 may output energy that may be directed at the subsurface region 26 as seismic waveform 48. A first receiver 44 may receive the reflection of the seismic waveform 48 off of one geological formation and a second receiver 46 may receive the reflection of the seismic waveform 48 off of a different geological formation. As such, the first receiver 44 may receive a reflected seismic waveform 50 and the second receiver 46 may receive a reflected seismic waveform 52.

Figure 4:
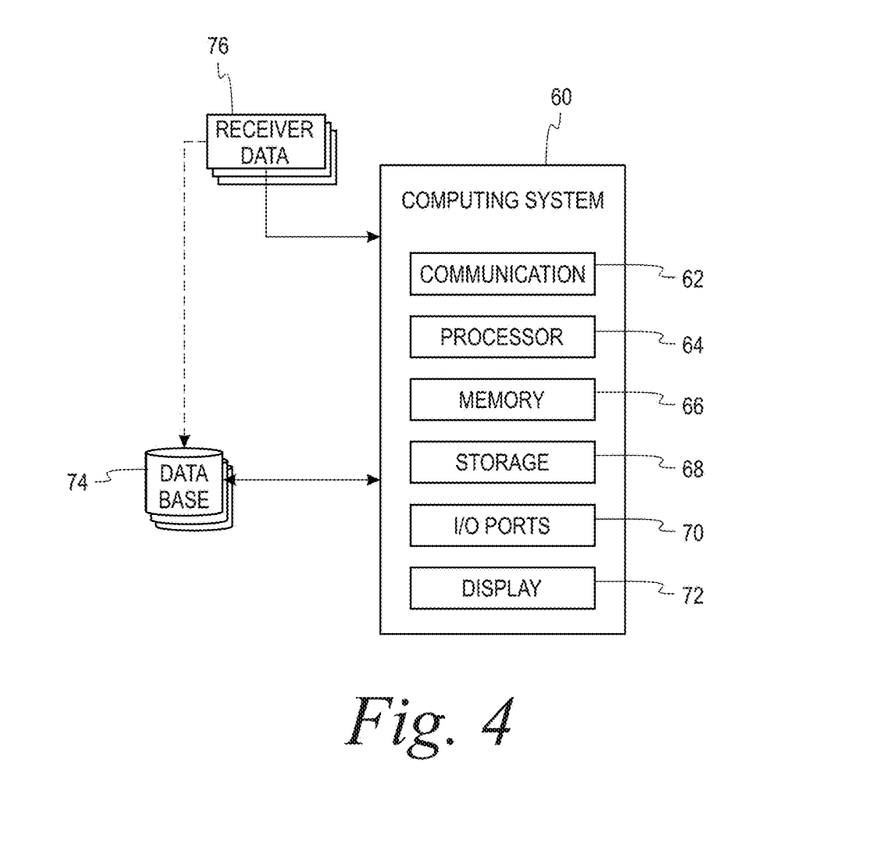
FIG. 4 illustrates a computing system that may perform operations described herein based on data acquired via the marine survey system of FIG. 2 and/or the second marine survey system of FIG. 3, in accordance with embodiments presented herein.

Regardless of how the seismic data is acquired, a computing system (e.g., for use in conjunction with block 12 of FIG. 1) may analyze the seismic waveforms acquired by the marine-based receivers 36 or the land-based receivers 44 and 46 to determine information regarding the geological structure, the location and property of hydrocarbon deposits, and the like within the subsurface region 26. FIG. 4 illustrates an example of such a computing system 60 that may perform various data analysis operations to analyze the seismic data acquired by the receivers 36, 44, or 46 to determine the structure of the geological formations within the subsurface region 26.

Referring now to FIG. 4, the computing system 60 may include a communication component 62, a processor 64, a memory 66, a storage 68, input/output (I/O) ports 70, a display 72, and the like. The communication component 62 may be a wireless or wired communication component that may facilitate communication between the receivers 36, 44, 46, one or more databases 74, other computing devices, and other communication capable devices. In one embodiment, the computing system 60 may receive receiver data 76 (e.g., seismic data, seismograms) that may have been previously acquired by seismic receivers via a network component, the database 74, or the like. The processor 64 of the computing system 60 may analyze or process the receiver data 76 to ascertain various features regarding geological formations within the subsurface region 26 of the Earth.

The processor 64 may be any type of computer processor or microprocessor capable of executing computer-executable code. The processor 64 may also include multiple processors that may perform the operations described below. The memory 66 and the storage 68 may be any suitable articles of manufacture that can serve as media to store processor-executable code, data, or the like. These articles of manufacture may represent computer-readable media (e.g., any suitable form of memory or storage) that may store the processor-executable code used by the processor 64 to perform the presently disclosed techniques. Generally, the processor 64 may execute software applications that include programs that process seismic data acquired via receivers of a seismic survey according to the embodiments described herein.

The memory 66 and the storage 68 may also be used to store the data, analysis of the data, the software applications, and the like. The memory 66 and the storage 68 may represent non-transitory computer-readable media (e.g., any suitable form of memory or storage) that may store the processor-executable code used by the processor 64 to perform various techniques described herein. It should be noted that non-transitory merely indicates that the media is tangible and not a signal.

The I/O ports 70 may be interfaces that may couple to other peripheral components such as input devices (e.g., keyboard, mouse), sensors, input/output (I/O) modules, and the like. I/O ports 70 may enable the computing system 60 to communicate with the other devices in the marine survey system 22, the land survey system 38, or the like via the I/O ports 70.

The display 72 may depict visualizations associated with software or executable code being processed by the processor 64. In one embodiment, the display 72 may be a touch display capable of receiving inputs from a user of the computing system 60. The display 72 may also be used to view and analyze results of the analysis of the acquired seismic data to determine the geological formations within the subsurface region 26, the location and property of hydrocarbon deposits within the subsurface region 26, and the like. The display 72 may be any suitable type of display, such as a liquid crystal display (LCD), plasma display, or an organic light emitting diode (OLED) display, for example. In addition to depicting the visualization described herein via the display 72, it should be noted that the computing system 60 may also depict the visualization via other tangible elements, such as paper (e.g., via printing) and the like.

With the foregoing in mind, the present techniques described herein may also be performed using a supercomputer that employs multiple computing systems 60, a cloud-computing system, or the like to distribute processes to be performed across multiple computing systems. In this case, each computing system 60 operating as part of a super computer may not include each component listed as part of the computing system 60. For example, each computing system 60 may not include the display component 72 since multiple display components 72 may not be useful to for a supercomputer designed to continuously process seismic data.

After performing various types of seismic data processing, the computing system 60 may store the results of the analysis in one or more databases 74. The databases 74 may be communicatively coupled to a network that may transmit and receive data to and from the computing system 60 via the communication component 62. In addition, the databases 74 may store information regarding the subsurface region 26, such as previous seismograms, geological sample data, seismic images, and the like regarding the subsurface region 26.

Although the components described above have been discussed with regard to the computing system 60, it should be noted that similar components may make up the computing system 60. Moreover, the computing system 60 may also be part of the marine survey system 22 or the land survey system 38, and thus may monitor and control certain operations of the sources 32 or 40, the receivers 36, 44, 46, and the like. Further, it should be noted that the listed components are provided as example components and the embodiments described herein are not to be limited to the components described with reference to FIG. 4.

In some embodiments, the computing system 60 may generate a two-dimensional representation or a three-dimensional representation of the subsurface region 26 based on the seismic data received via the receivers mentioned above. Additionally, seismic data associated with multiple source/receiver combinations may be combined to create a near continuous profile of the subsurface region 26 that can extend for some distance. In a two-dimensional (2-D) seismic survey, the receiver locations may be placed along a single line, whereas in a three-dimensional (3-D) survey the receiver locations may be distributed across the surface in a grid pattern. As such, a 2-D seismic survey may provide a cross sectional picture (vertical slice) of the Earth layers as they exist directly beneath the recording locations. A 3-D seismic survey, on the other hand, may create a data "cube" or volume that may correspond to a 3-D picture of the subsurface region 26.

In addition, a 4-D (or time-lapse) seismic survey may include seismic data acquired during a 3-D survey at multiple times. Using the different seismic images acquired at different times, the computing system 60 may compare the two images to identify changes in the subsurface region 26.

In any case, a seismic survey may be composed of a very large number of individual seismic recordings or traces. As such, the computing system 60 may be employed to analyze the acquired seismic data to obtain an image representative of the subsurface region 26 and to determine locations and properties of hydrocarbon deposits. To that end, a variety of seismic data processing algorithms may be used to remove noise from the acquired seismic data, migrate the pre-processed seismic data, identify shifts between multiple seismic images, align multiple seismic images, and the like.

After the computing system 60 analyzes the acquired seismic data, the results of the seismic data analysis (e.g., seismogram, seismic images, map of geological formations, etc.) may be used to perform various operations within the hydrocarbon exploration and production industries. For instance, as described above, the acquired seismic data may be used to perform the method 10 of FIG. 1 that details various processes that may be undertaken based on the analysis of the acquired seismic data.

Figure 5:
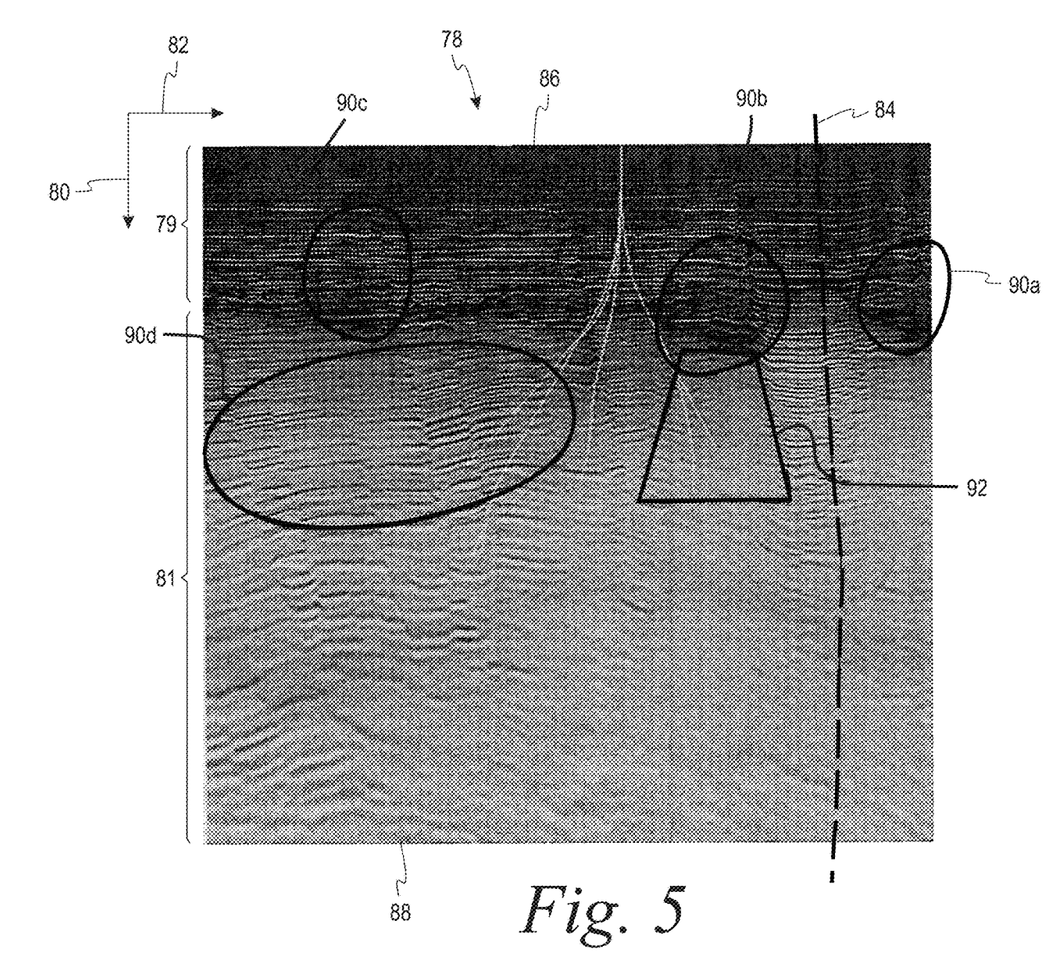
FIG. 5 illustrates an example of a seismic images generated by the computing system of FIG. 4, in accordance with embodiments presented herein.

As discussed above, the computing system 60 may be employed to analyze the acquired seismic data based on the reflected seismic waveforms 52 to obtain an image representative of the subsurface region 26 and to determine locations and properties of hydrocarbon deposits. FIG. 5 shows an image 78 (e.g., a velocity model) of a region (e.g., subsurface region 26) that was generated by rendering a seismic image with a seismic velocity, which is generated by Full Waveform Inversion (FWI). FWI seismic data processing generally operates to create a subsurface (velocity) model estimate through minimization of differences between acquired seismic data and simulated (i.e., modeled) seismic data. To facilitate discussion of the image 78, FIG. 5 includes two axes 80 and 82, which represent a depth and a distance along a surface (e.g., a distance along a surface of the seafloor 28 or a surface 42 of the Earth), respectively. The image 78 includes a varying shade that is indicative of a velocity of the seismic waves traveling through a subsurface region: the darker shaded region 79 representing a relatively slow velocity of the seismic waveforms and the lighter shaded region 81 representing a faster velocity of the seismic waveforms. For example, moving along the line 84 from the top side 86 of the image 78 to the bottom side 88 of the image 78, the shade of the image generally becomes lighter. As such, the velocity of the seismic waves deeper in the subsurface region (e.g., further down the image 78 along the axis 80 from the darker shaded region 79 to the lighter shaded region 81) tend to increase.

The velocity of seismic waves generally increasing at increasing depths may relate to the increasing pressure at greater depths in a subsurface region. Further, the velocity of the seismic waves may vary based on the composition (e.g., rock, shale, sand, porosity of rock, presence of liquids, and presence of gas) of the geological formation of the subsurface region. As such, the varying velocity of the seismic waves is indicative of the type of formation and may be used to determine the location of hydrocarbon deposits (e.g., where the velocity of the seismic waves decreases, rather than increasing).

Referring back to FIG. 5, the image 78 includes multiple regions 90a, 90b, 90c, and 90d that are possible hydrocarbon deposits locations. Specifically, the velocity of the seismic waves decreases in the regions 90a, 90b, 90c, and 90d. Some of the regions of hydrocarbon deposits are more apparent than others (e.g., the magnitude of seismic wave velocity decrease is greater). Moreover, the regions 90a, 90b, 90c, and 90d may create a "shadow" effect (e.g., mask region 92) based on the change in seismic wave velocity and seismic attenuation that may mask regions 90 that may exist below the regions 90a, 90b, 90c, and 90d, and prevent additional regions 90 of hydrocarbon deposits from being located. Additionally, as discussed herein, the sensitivity of the velocity may decrease with increasing depth (e.g., due to changes in the composition of the formation).

The present disclosure is directed to techniques for identifying hydrocarbon deposits with increased sensitivity at greater depths within a subsurface region. As discussed above, the image 78 was generated based on the FWI velocity model; however the image 78, and more specifically the analysis, may not be effective at revealing hydrocarbon deposits deep within a subsurface region and/or hydrocarbon deposits that lay in particular formation types, for example. In some embodiments, an attribute model may be generated using a combination of a first velocity model (e.g., the FWI velocity model or FWI velocity for short) and a physical attribute (e.g., properties indicative of the geological formation in the subsurface region 26) of an area surrounding the subsurface region. For example, the FWI velocity may be written as an average (e.g., arithmetic average, harmonic average, geometric average, and the like) of multiple physical parameters, such as the velocity of the different rock formations and/or velocity of rocks including different fluids. The parameters may be obtained from any suitable methods, such as from a downhole tool in a well. It should be understood that the techniques to how the seismic velocity is derived are not limited. That is, seismic velocity derived from FWI velocity or any other method can be applied in the techniques.

As a non-limiting example, the FWI velocity may be expressed as a geometric average of the velocity of rocks filled with brine, $V_{brine}$, and a velocity of rocks filled with hydrocarbon, $V_{hc}$, and each velocity (e.g., physical attribute) is weighted with a saturation-based-on-velocity term, SV:

$$V_{PWI} = (V_{brine})^{1-SV}(V_{hc})^{SV}$$

However, it should be noted that other averaging methods other than geometric average of $V_{brine}$ and $V_{hc}$ described above, for example, arithmetic average, harmonic average, or the like or any equation that can fit sediment velocity as a function of $V_{brine}$, $V_{hc}$, and hydrocarbon saturation may be utilized. In some embodiments, the $V_{brine}$ and $V_{hc}$ may be 1-dimensional values from well logs (e.g., velocity as a function of depth). In other embodiments, each velocity may be determined based on an extrapolation or interpolation of a trend observed or determined from suitable methods (e.g., well-log data). In other embodiments, $V_{brine}$ and $V_{hc}$ may be 2D and/or 3D, which may further improve the accuracy of the presently described technique.

In the example, the equation may be rearranged to solve for SV:

$$SV = \frac{\log\left(\frac{V_{FWI}}{V_{brine}}\right)}{\log\left(\frac{V_{hc}}{V_{brine}}\right)}$$

It should be appreciated by one of ordinary skill in the art that while the physical definition of hydrocarbon saturation may be different from SV, the attribute SV may correlate directly with saturation and calibrate the effect of different fluids (e.g., water, brine, hydrocarbon, gas) on the seismic wave velocity at the majority of depths. As such, the present techniques may be applied to exploration near existing infrastructure. Moreover, utilization of SV may allow for velocity models that better illustrate hydrocarbons at increased reservoir depths, since commonly the effects of hydrocarbons on the seismic velocity model are subtle as reservoir depth increases. In this manner, the utilization of SV operates as a calibration or adjustment of the seismic velocity model such that SV (e.g., an attribute related to hydrocarbon saturation) is created with a seismic velocity model and well log data to highlight areas (e.g., regions 90a, 90b, 90c, 90d, and 90e of FIG. 6 discussed below) where velocity is influenced by hydrocarbons.

While the SV equation above is based on $V_{brine}$ and $V_{hc}$, it should be appreciated the velocities used depend on the geological formations being studied. Furthermore, it may be advantageous to generate a rendering image based on the SV equation for certain depths within a subsurface region. As such, a depth threshold may be determined that is more suitable for using the SV equation to generate a rendering image. Further, in some embodiments, a seismic attenuation model or shear wave velocity model may be generated based on the attribute model.

Figure 6:
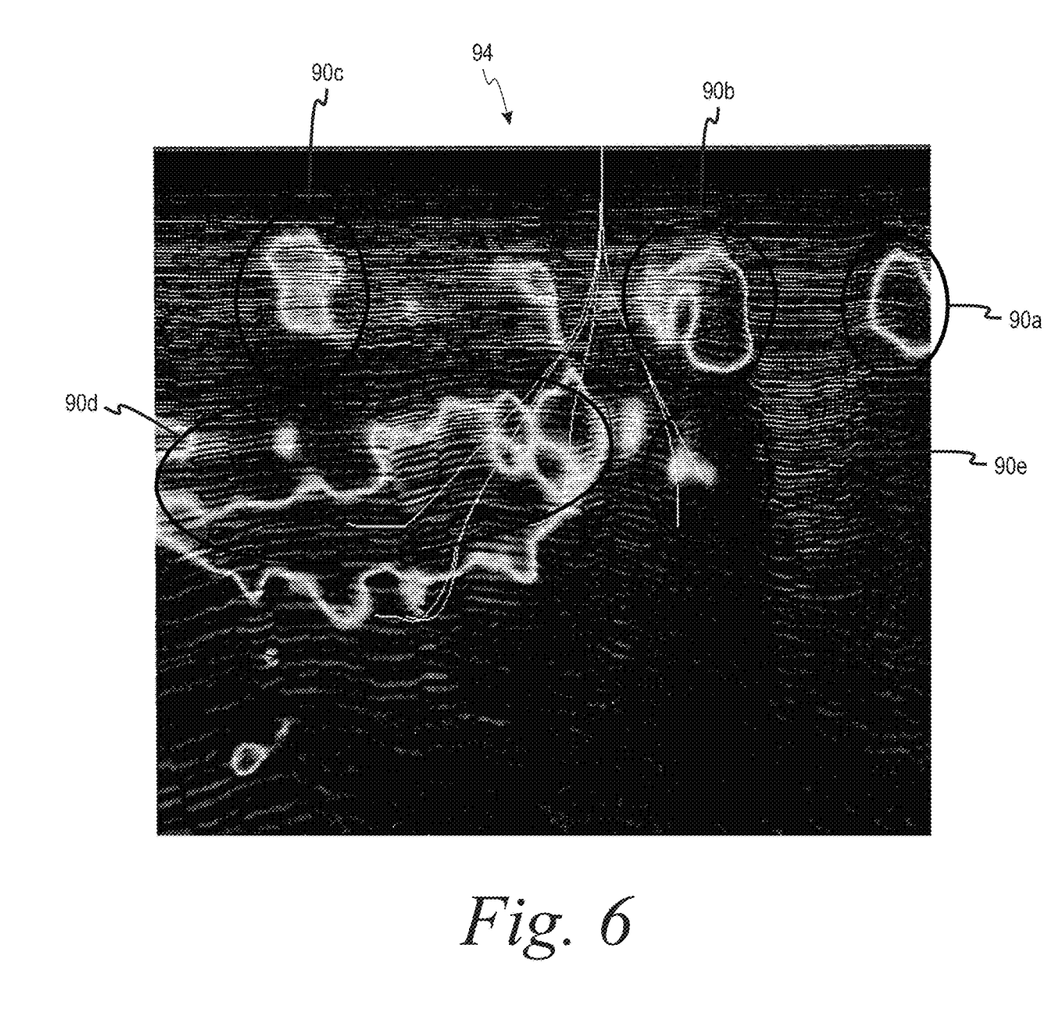
FIG. 6 illustrates another example of a seismic image generated by the computing system of FIG. 4, in accordance with embodiments presented herein.

FIG. 6 shows an image 94 that is generated using the SV term based on the image 78 shown in FIG. 5, in accordance with the present disclosure. That is, the image 94 shows the same subsurface region 26 as image 78. The dark shades indicate a low SV value, which is indicative of little to no hydrocarbon being present, while the lighter regions are indicative of hydrocarbons. For example, the image 94 illustrates the same four regions 90a, 90b, 90c, and 90d of FIG. 5 and these regions 90a, 90b, 90c, and 90d in FIG. 6 are indicative of hydrocarbon deposits (e.g., regions containing hydrocarbons). As previously noted, the regions 90a, 90b, 90c, and 90d correspond to the regions shown in image 78 (e.g., as shown in FIG. 5), however the regions 90a, 90b, 90c, and 90d in FIG. 6 are more apparent (i.e., the visualizations of the regions containing hydrocarbons more readily apparent in the image 94 relative to image 78). Furthermore, an additional region 90e is illustrated in image 94, whereas this region 90e overlapped with a mask region 92 (e.g., as shown in FIG. 5).

In some embodiments, the computing system 60 may provide an indication of the regions 90a, 90b, 90c, 90d, and 90e. For example, the computing system 60 may determine a subset of the image 94 that includes pixels having values indicative of the presence of hydrocarbons that are above a threshold. As such, the computing system 60 may provide an indication of the region of the subsurface 26 that is likely to have hydrocarbons and provide a position (e.g., coordinates or a relative area) of the regions 90a, 90b, 90c, 90d, and 90e that contain the hydrocarbon deposits and/or (in some cases) subsurface drilling hazards. In other embodiments, the image generated in accordance with the present techniques (e.g., image 94) may be displayed via the display 72 of the computing system 60, thus facilitating locating a region 90a, 90b, 90c, 90d, and 90e by a user of the computing system 60.

Figure 7:
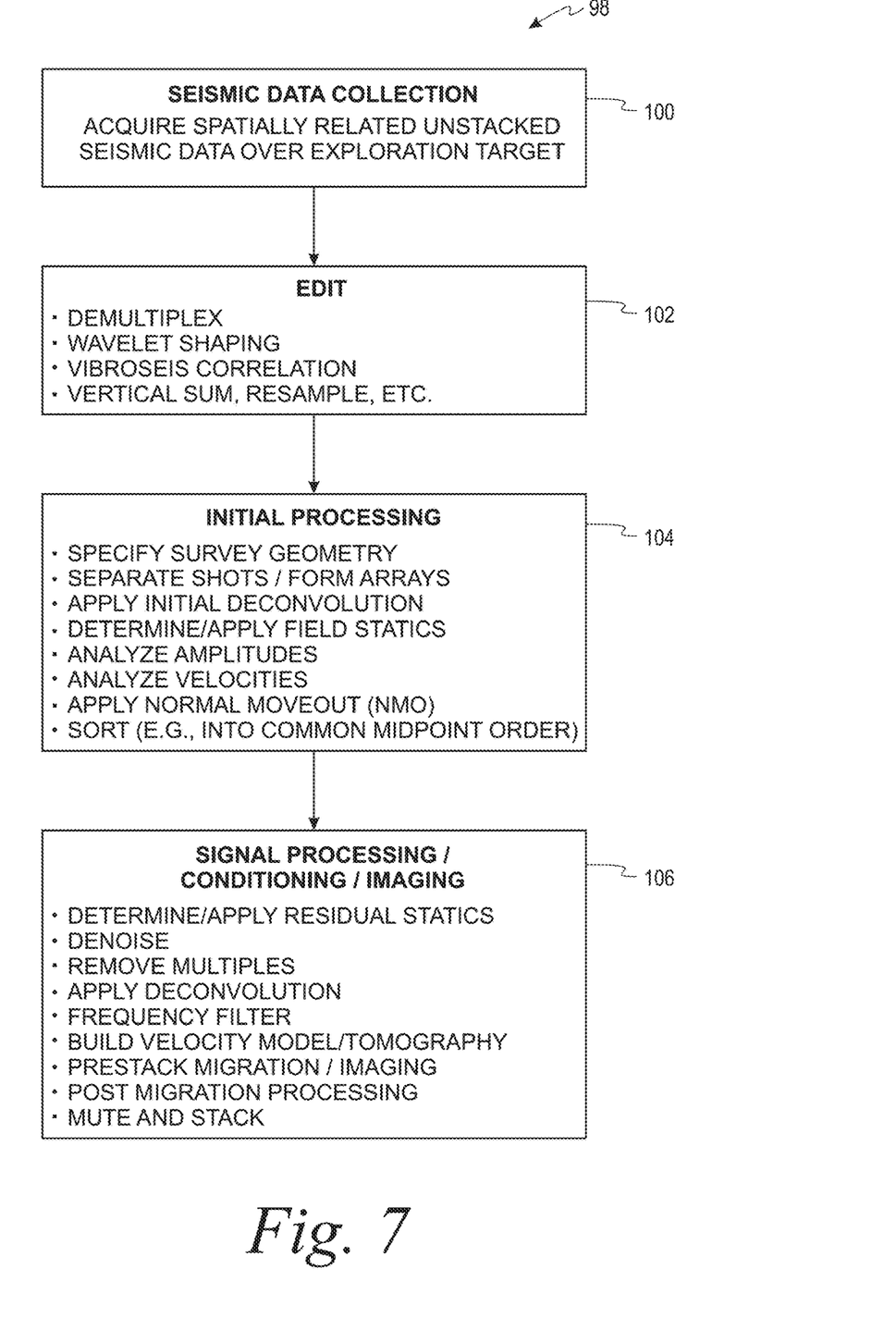
FIG. 7 illustrates a flow chart of a method for generating a seismic image via the computing system of FIG. 4, in accordance with embodiments presented herein.

In some embodiments, the image 94 may be generated in conjunction with a seismic processing scheme such as, for example, the method 98 illustrated in FIG. 7. As illustrated, method 98 includes a seismic processing sequence that includes seismic data collection in step 100, editing of the seismic data in step 102, initial processing in step 104, and signal processing, conditioning, velocity model building (such as defining an attenuation model, a shear wave velocity model, etc.), and imaging (which may, for example, include production of imaged sections or volumes) in step 106 prior to any interpretation of the seismic data, any further image enhancement consistent with the exploration objectives desired, generation of attributes from the processed seismic data, reinterpretation of the seismic data as needed, and determination and/or generation of a drilling prospect or other seismic survey applications. As a result of the processing method 98, location of hydrocarbons within a subsurface region 26 (e.g., in regions 90a, 90b, 90c, 90d, and 90e) may be identified. Location of these hydrocarbons contained in hydrocarbon deposits may be based on a modified or otherwise calibrated FWI velocity model. As previously discussed, one embodiment of the present disclosure relates to producing an attribute model (inclusive of SV) based on a seismic velocity model in combination with a physical attribute associated with the subsurface region 26. In one embodiment, the physical attributes are velocities of seismic waveforms through different geological formations, such as sand, shale, rock filled with brine, and/or rock filled with hydrocarbon, which are determined by other suitable methods (e.g., from a well-log). Based on the different geological formations present, as well as the composition of the geological formations present, the velocity model may be expressed as an average of the each determined velocity for a geological formation. Further, each determined velocity for a geological formation is given a weight that is proportional to a saturation based on velocity, SV, which may be determined by the determined velocities and the seismic velocity model. As such, the attribute model may improve the detection of hydrocarbons, for example, at greater depths within a subsurface region. Additionally, The embodiments described above can also be used to generate complex overburden pressure prediction by using seismic velocity in land or marine settings, which may facilitate the detection of hydrocarbon as well as underground hazards.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A computer-implemented method, comprising:
generating a velocity model based upon seismic waveforms via a velocity model builder;
receiving data representative of a physical attribute of an area surrounding one or more wells, wherein the data comprises a sediment velocity of a formation in a region of a subsurface filled with brine;
generating an attribute model based upon the velocity model and the data; and
rendering an image based upon the attribute model for use with seismic exploration above the region comprising a hydrocarbon reservoir and containing structural or stratigraphic features conducive to a presence, migration, or accumulation of hydrocarbons.

2. The computer-implemented method of claim 1, comprising generating the sediment velocity of the formation in the region of the subsurface filled with brine based upon log data of the one or more well.

3. The computer-implemented method of claim 1, wherein the data comprises a sediment velocity of the formation in the region of the subsurface filled with the hydrocarbons.

4. The computer-implemented method of claim 3, further comprising generating the sediment velocity of the formation in the region of the subsurface filled with the hydrocarbons based upon log data of the well.

5. The computer-implemented method of claim 1, further comprising utilizing Full Waveform Inversion in conjunction with the velocity model builder.

6. The computer-implemented method of claim 1, further comprising utilizing tomography in conjunction with the velocity model builder.

7. The computer-implemented method of claim 1, wherein the attribute model indicates a fluid saturation of the formation in the region of the subsurface.

8. The computer-implemented method of claim 1, wherein the attribute model comprises the velocity model calibrated to reflect an impact of fluid saturation of the formation in the region of the subsurface on a values of the velocity model.

9. A device, comprising:
a processor configured to:
generate a velocity model based upon seismic waveforms via a seismic velocity model builder utilizing full waveform inversion or tomography;
receive first data representative of a first physical attribute of an area surrounding a well and second data representative of a second physical attribute of an area surrounding a well, wherein the first data comprises a sediment velocity of a formation in a region of a subsurface filled with brine;
determine a calibration factor based upon the velocity model, the first data, and the second data; and
generate an image based upon the calibration factor for use with seismic exploration above the region comprising a hydrocarbon reservoir and containing structural or stratigraphic features conducive to a presence, migration, or accumulation of hydrocarbons.

10. The device of claim 9, wherein the second data comprises a sediment velocity of the formation in the region of the subsurface filled with the hydrocarbons.

11. The device of claim 10, wherein the processor is configured to apply a first weight value to the first data to generate weighted first data and apply a second weight value to the second data to generate weighted second data.

12. The device of claim 11, wherein the processor is configured to equate a velocity of the velocity model with the first weighed data and the second weighted data.

13. The device of claim 12, wherein the processor is configured to determine the calibration factor as a term in the first weight value and a term in the second weight value as derived via equating of the velocity of the velocity model with the first weighted data and the second weighted data.

14. The device of claim 9, wherein the calibration factor indicates a fluid saturation of the formation in the region of the subsurface.

15. The device of claim 9, wherein the calibration factor reflects an impact of fluid saturation of the formation in the region of the subsurface on the values of the velocity model.

16. One or more tangible, non-transitory, machine-readable media comprising instructions configured to cause a processor to:
derive a velocity model based upon seismic waveforms via a seismic model builder;
receive data representative of a physical attribute of an area surrounding a well, wherein the data comprises a sediment velocity of a formation in a subsurface region filled with brine;
generate an attribute model based upon the velocity model and the data; and
render a seismic image based upon the attribute model representative of hydrocarbons in the subsurface region of Earth.

17. The one or more machine-readable media of claim 16, wherein the seismic image comprises a position of the hydrocarbons in the subsurface region of the Earth.

18. The one or more machine-readable media of claim 16, comprising instructions configured to cause a processor to transmit the seismic image for display on a display.

* * * * *